Figure 1:
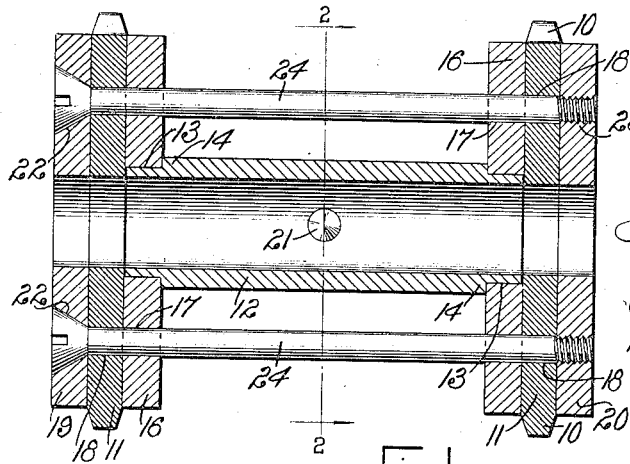

J. DOMERHUIZEN.
SPROCKET WHEEL.
APPLICATION FILED JULY 6, 1916.

1,209,406.

Patented Dec. 19, 1916.

WITNESSES
C. K. Reichenbach.
Geo. L. Beeler.

INVENTOR
J. Domerhuizen
BY
ATTORNEYS

UNITED STATES PATENT OFFICE.

JOHN DOMERHUIZEN, OF NEW YORK, N. Y.

SPROCKET-WHEEL.

1,209,406.

Specification of Letters Patent.

Patented Dec. 19, 1916.

Application filed July 6, 1916. Serial No. 107,753.

*To all whom it may concern:*

Be it known that I, JOHN DOMERHUIZEN, a citizen of the United States, and a resident of the city of New York, borough of Manhattan, in the county and State of New York, have invented a new and Improved Sprocket-Wheel, of which the following is a full, clear, and exact description.

This invention relates to power transmitting devices and has particular reference to improved means for constructing sprocket wheels or the like.

Among the objects of this invention is to improve the construction of a sprocket wheel adapted for general utility and having particular reference to sprocket wheels for controlling the movement of a moving picture film. This special reference, however, to a particular art I do not wish to have interpreted as a limitation in any manner as to the adaptability of the improvement.

In a film sprocket wheel great disadvantage has been experienced in the replacement of worn sprockets and one of my purposes in this improvement is to provide a means whereby the mechanism may be simplified both in construction and in manipulation, and whereby a worn sprocket may be replaced by a new one with a minimum expenditure of time and money.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 2:
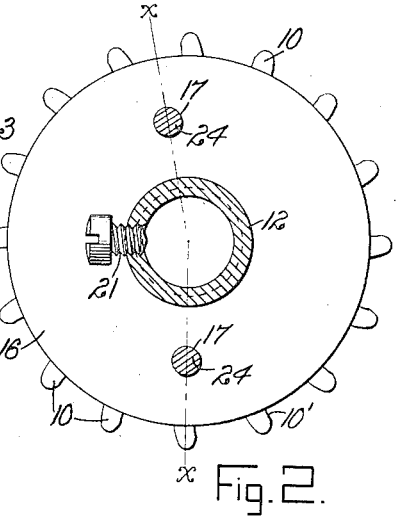
Figures 3, 4:
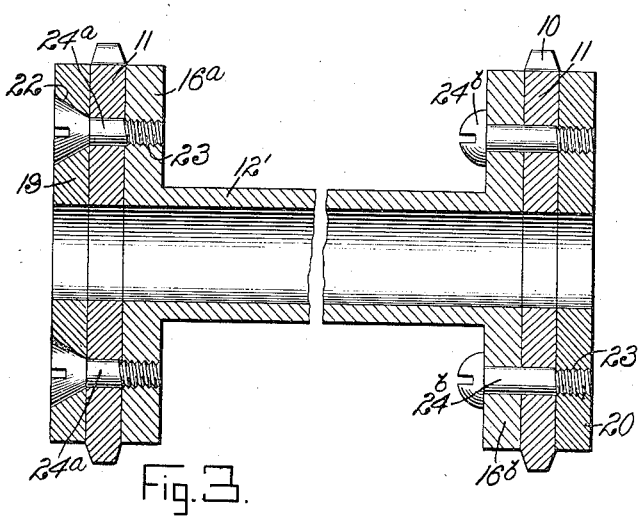

Figure 1 is a vertical longitudinal section on the line *x—x* of Fig. 2, showing one form of the improvement; Fig. 2 is a vertical transverse section of the same on the line 2—2 of Fig. 1; and Figs. 3 and 4 are vertical longitudinal sectional details of other modified forms.

Referring now more particularly to the drawings, I show in Figs. 1 and 2, a sprocket wheel of the duplex type, but one in which two series of sprocket teeth are provided, arranged in parallel planes, the teeth 10 of each series being secured to or formed on a disk 11. These teeth, as indicated in Fig. 2, are inclined slightly to the radii passing therethrough, or in other words, are slightly undercut on one side, as indicated at 10'. For certain classes of work this undercut or hook effect is essential or important, but it is also important that the amount of undercut shall not be excessive. The wear upon the sprocket teeth usually occurs on the undercut side, and hence the life of the wheel under the ordinary practice is determined by this wear upon the undercut sides of the teeth.

So far as I am aware, in a sprocket wheel of the character suggested in the drawings, in which there are a plurality of series of teeth, the structure as a whole is commonly made of a single piece of material, requiring much machining and expense. In this improvement, however, I provide a means whereby the disk or part which carries the teeth may be made as a separate part from the structure as a whole and may be replaced at low cost. Furthermore, since the teeth are formed upon the disk or the like of comparatively thin metal, the toothed device may be made of much better quality of metal than would ordinarily be used in making the entire structure and thereby the life of the wheel is greatly prolonged.

In the form shown in Fig. 1, I provide a tubular hub 12 having its ends reduced or rabbeted at 13, forming shoulders 14 upon which are fitted a pair of disks 16, preferably duplicates of each other. These disks are provided with holes 17 on opposite sides of the hub not directly or diametrically opposite each other, as shown in Fig. 2. The sprocket disks 11 are provided with similar holes 18 spaced similarly from each other circumferentially and radially. The purpose of this staggering of the holes is to facilitate the assemblage of the wheel structure, so as to insure that the teeth will always be inclined in the proper direction. The disks 11 are fitted squarely against the outer faces of the disks 16 and are clamped thereto by means of outside or end disks 19 and 20. The sprocket disks and the end disks have axial holes of a size corresponding to the inner diameter of the hub 12 for application to a shaft or the like, such application being made secure by a set screw 21 or its equivalent. The end disk 19 is provided with countersunk holes 22 and the other end disk is provided with tapped holes 23. A pair of clamping bolts or screws 24 are projected through the holes 22, 18, and 17 at one end and extend thence from one head to the other through the holes 17 and 18 of the other head and into the holes 23. The tightening of the screws in the holes 23 serves to clamp all the parts rigidly together, movement of the heads toward each other being limited by the shoulders 14 of the hub. With the disk holes arranged as stated above it is impossible for the duplex structure to be assembled without having all of the teeth of both series pointing in the same direction.

The wheel structure suggested in Figs. 3 and 4 are somewhat alike in that each of them provides a hub 12' formed integral with one of the head disks. The head disk 16$^a$ of Fig. 3 is tapped at 23 for clamping screws 24$^a$ projecting through a sprocket disk 11 and an end disk 19 of the same character as shown in Fig. 1. This structure provides practically the same facility for renewal of a worn sprocket wheel as in the first modification described. The other end of the structure suggested in Fig. 3 may be a duplicate of the one shown, or it may differ in providing the screws 24$^b$ with rounded heads projected outwardly through the inner head disk 16$^b$ and into a tapped end disk 20, which is a duplicate of the form shown in Fig. 1. In all forms of the invention, no parts project beyond the end disks.

I claim:

1. In a sprocket wheel, the combination of a hub having rabbeted ends, a pair of disks fitted upon said rabbeted ends, a pair of toothed disks lying against the outer faces of the first mentioned disks, a pair of end members abutting against the outer faces of the toothed disks, all of said disks and end members having longitudinally alined holes, and a plurality of clamping members extending through said holes and securing the disks and end members together and locking the same to the hub.

2. In a sprocket wheel, the combination of a hollow cylindrical hub having rabbeted ends, a pair of disks fitted upon said rabbeted ends, a pair of toothed members lying against the outer faces of said disks, a pair of end disks lying against the outer faces of said members, said latter mentioned disks and members having axial holes of the same diameter as the interior diameter of the hub, all of said disks and members having longitudinally alined holes, one of the end disks having its holes countersunk and the other end disk having its holes tapped, and a pair of clamping bolts extending through all of said holes from one end disk to the other, said bolts having heads located in said countersunk holes, and threaded ends coöperating with the said tapped holes and serving to clamp all of the parts together, substantially as set forth.

3. In a sprocket wheel, the combination of a hub, a pair of flat members carried on the ends of the hub, said members having coaxially arranged holes unequally spaced circumferentially, a pair of toothed disks lying against the outer faces of the members aforesaid, a pair of end members abutting against the outer faces of the disks, said latter mentioned members and the disks having holes registering with the holes first mentioned, and a plurality of binding screws passing through said members and disks to secure all the parts rigidly together.

JOHN DOMERHUIZEN.